US012789571B2

(12) United States Patent
Velez-Ramirez et al.

(10) Patent No.: US 12,789,571 B2
(45) Date of Patent: Nov. 10, 2026

(54) STRUT ASSEMBLY INCLUDING TWIST-LOCK DUST BOOT

(71) Applicant: GM GLOBAL TECHNOLOGY OPERATIONS LLC, Detroit, MI (US)

(72) Inventors: Christopher Velez-Ramirez, Royal Oak, MI (US); Nate Maye-Bloom, Clawson, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 620 days.

(21) Appl. No.: 18/364,215

(22) Filed: Aug. 2, 2023

(65) Prior Publication Data

US 2025/0042210 A1 Feb. 6, 2025

(51) Int. Cl.
*B60G 15/06* (2006.01)

(52) U.S. Cl.
CPC .... *B60G 15/062* (2013.01); *B60G 2204/1242* (2013.01); *B60G 2204/4308* (2013.01)

(58) Field of Classification Search
None
See application file for complete search history.

(56) References Cited

U.S. PATENT DOCUMENTS 9,440,505 B2 * 9/2016 Tsunekawa ............ B60G 11/14
9,446,647 B2 * 9/2016 Kawahara ............ B60G 15/062

FOREIGN PATENT DOCUMENTS

| | | | |
|---|---|---|---|
| DE | 102007059800 | A1 | 6/2009 |
| DE | 102015217652 | A1 | 3/2016 |
| DE | 102019215746 | A1 | 11/2020 |
| JP | 5912621 | B2 | 4/2016 |

OTHER PUBLICATIONS

German Office Action from counterpart DE1020231261878, dated Jan. 14, 2025.

* cited by examiner

*Primary Examiner* — Robert A. Siconolfi
*Assistant Examiner* — Karem Akram Algarash

(57) ABSTRACT

A strut assembly configured to be mounted to a vehicle. The strut assembly includes: a damper including an outer tube and a piston rod extending out from within the outer tube; a striker cap on the outer tube and defining an aperture through which the piston rod extends, the striker cap including a plurality of retention tabs each having a ramped surface extending to a retention surface that is non-orthogonal to the ramped surface; a spring extending around the piston rod; and a dust boot extending around the piston rod and arranged between the spring and the piston rod, the dust boot including a plurality of dust boot locking tabs configured to cooperate with the plurality of retention tabs to lock the dust boot to the striker cap.

17 Claims, 6 Drawing Sheets

FIG. 6
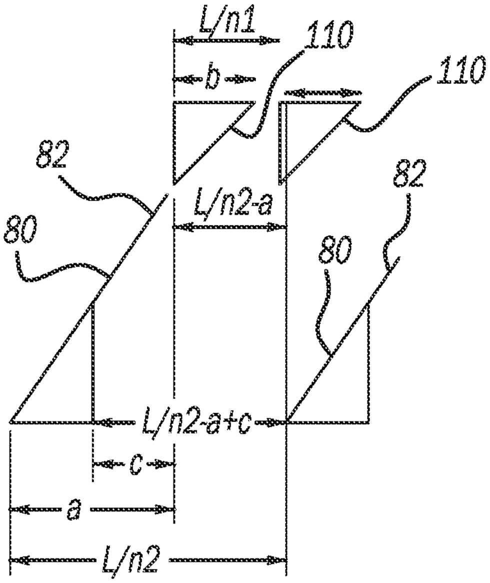
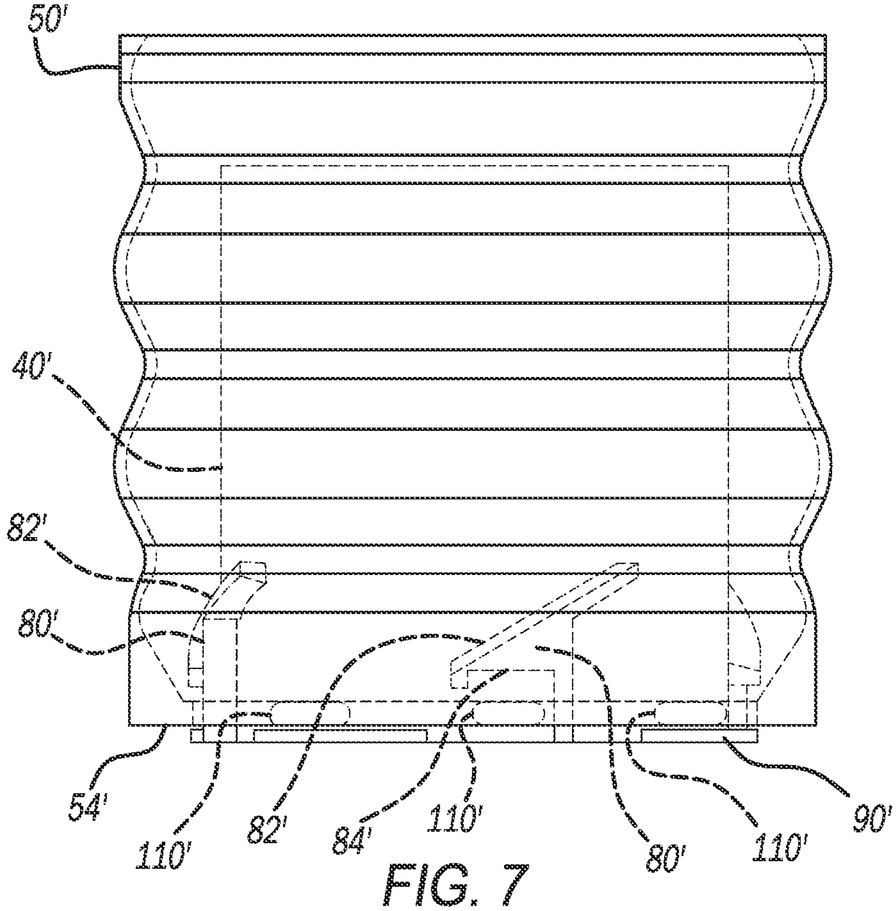
FIG. 7

STRUT ASSEMBLY INCLUDING TWIST-LOCK DUST BOOT

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a strut assembly including a twist-lock dust boot.

Vehicle suspension systems often include strut assemblies configured to dampen vibrations. Strut assemblies typically include a damper, which has a housing and a piston rod seated in the housing. The housing includes fluid configured to dampen movement of the piston rod. The piston rod is covered by a protective dust boot.

SUMMARY

Various features of the present disclosure include a strut assembly configured to be mounted to a vehicle. The strut assembly includes: a damper including an outer tube and a piston rod extending out from within the outer tube; a striker cap on the outer tube and defining an aperture through which the piston rod extends, the striker cap including a plurality of retention tabs each having a ramped surface extending to a retention surface that is non-orthogonal to the ramped surface; a spring extending around the piston rod; and a dust boot extending around the piston rod and arranged between the spring and the piston rod, the dust boot including a plurality of dust boot locking tabs configured to cooperate with the plurality of retention tabs to lock the dust boot to the striker cap.

In further features, the striker cap includes a top surface defining the aperture and a circular sidewall extending from the top surface; and the plurality of retention tabs are spaced apart about the circular sidewall.

In further features, the ramped surface of each one of the plurality of retention tabs extends non-orthogonal to a plane extending along the top surface; and the retention surface of each one of the plurality of retention tabs extends parallel to the plane extending across the top surface.

In further features, each one of the plurality of retention tabs further includes a stop flange between the retention surface and the top surface of the striker cap.

In further features, each one of the plurality of retention tabs includes an upper tip at an upper end of the plurality of retention tabs, the retention surface is at a lower end of the plurality of retention tabs.

In further features, the striker cap further includes a plurality of stop tabs spaced apart around a bottom end of the circular sidewall that is opposite to the top surface.

In further features, the plurality of stop tabs are laterally spaced apart from, and offset from, the retention tabs such that each one of the plurality of stop tabs is between two of the plurality of retention tabs.

In further features, each one of the plurality of dust boot locking tabs is inside the dust boot and configured to slide along the ramped surface into cooperation with the retention surface of the plurality of retention tabs to rotate the dust boot and lock the dust boot to the striker cap.

In further features, each one of the plurality of dust boot locking tabs includes a distal tip.

In further features, each one of the plurality of dust boot locking tabs includes a chamfered surface configured to abut a circular sidewall of the striker cap.

In further features, the dust boot includes a boot flange configured as an integrated upper spring isolator at an upper end of the dust boot.

The present disclosure further includes, in various features, a strut assembly configured to be mounted to a vehicle. The strut assembly includes: a damper including an outer tube and a piston rod slidably movable within the outer tube; a striker cap on the outer tube, the striker cap including: a top surface defining an aperture through which the piston rod extends; a circular sidewall extending from the top surface, the circular sidewall including a bottom end opposite to the top surface; and a plurality of retention tabs evenly spaced apart about the circular sidewall, each one of the plurality of retention tabs including a ramped surface extending to a retention surface that is non-orthogonal to the ramped surface, the ramped surface is non-orthogonal to a plane extending along the top surface, and the retention surface is closer to the bottom end than the top surface. The strut assembly also includes a spring extending around the piston rod; and a dust boot extending around the piston rod and arranged between the spring and the piston rod, the dust boot including a plurality of boot locking tabs at an interior of the dust boot, the plurality of boot locking tabs are configured to cooperate with the plurality of retention tabs to lock the dust boot to the striker cap.

In further features, the retention surface is beneath the ramped surface.

In further features, each one of the plurality of retention tabs further includes a stop flange between the retention surface and the top surface of the striker cap.

In further features, each one of the plurality of retention tabs further includes an upper tip at an upper end of the plurality of retention tabs, the stop flange is beneath the upper tip and between the upper tip and the retention surface.

In further features, the striker cap further includes a plurality of stop tabs spaced apart around the bottom end of the circular sidewall, the plurality of stop tabs are laterally spaced apart from, and vertically offset from, the retention tabs such that each one of the plurality of stop tabs is between two of the plurality of retention tabs.

In further features, the dust boot includes a boot flange configured as an integrated upper spring isolator at an upper end of the dust boot.

The present disclosure also includes, in various features, a strut assembly configured to be mounted to a vehicle. The strut assembly includes a damper including an outer tube and a piston rod slidably movable within the outer tube; a top mount in cooperation with a distal end of the piston rod; a striker cap on the outer tube, the striker cap including: a top surface defining an aperture through which the piston rod extends; a circular sidewall extending from the top surface, the circular sidewall including a bottom end opposite to the top surface; a plurality of retention tabs evenly spaced apart about the circular sidewall, each one of the plurality of retention tabs including a ramped surface extending to a retention surface that is non-orthogonal to the ramped surface, the ramped surface is non-orthogonal to a plane extending along the top surface, and the retention surface is closer to the bottom end than the top surface; and a plurality of stop tabs spaced apart around the bottom end of the circular sidewall, the plurality of stop tabs are laterally offset from the retention tabs. The strut assembly further includes a spring extending around the piston rod; and a dust boot extending around the piston rod and arranged between the spring and the piston rod, the dust boot including: a flange at a top end of the dust boot, the flange configured as an integrated upper spring isolator configured to cooperate with the spring; a first plurality of dust boot locking tabs within the dust boot, each one of the first plurality of dust boot locking tabs is configured to slide along the ramped surface into cooperation with the retention surface of the plurality of retention tabs to rotate the dust boot and lock the dust boot onto the striker cap; and a second plurality of dust boot locking tabs within the dust boot, each one of the second plurality of dust boot locking tabs is configured to align vertically with one of the plurality of stop tabs when the first plurality of dust boot locking tabs are in cooperation with the retention surfaces of the plurality of retention tabs.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 6 schematically illustrates interaction between retention tabs of the dust boot and ramped surfaces of the striker cap; and FIG. 7 illustrates cooperation between another dust boot and another striker cap in accordance with the present disclosure.

In the drawings, reference numbers may be reused to identify similar and/or identical elements.

DETAILED DESCRIPTION

Figure 1:
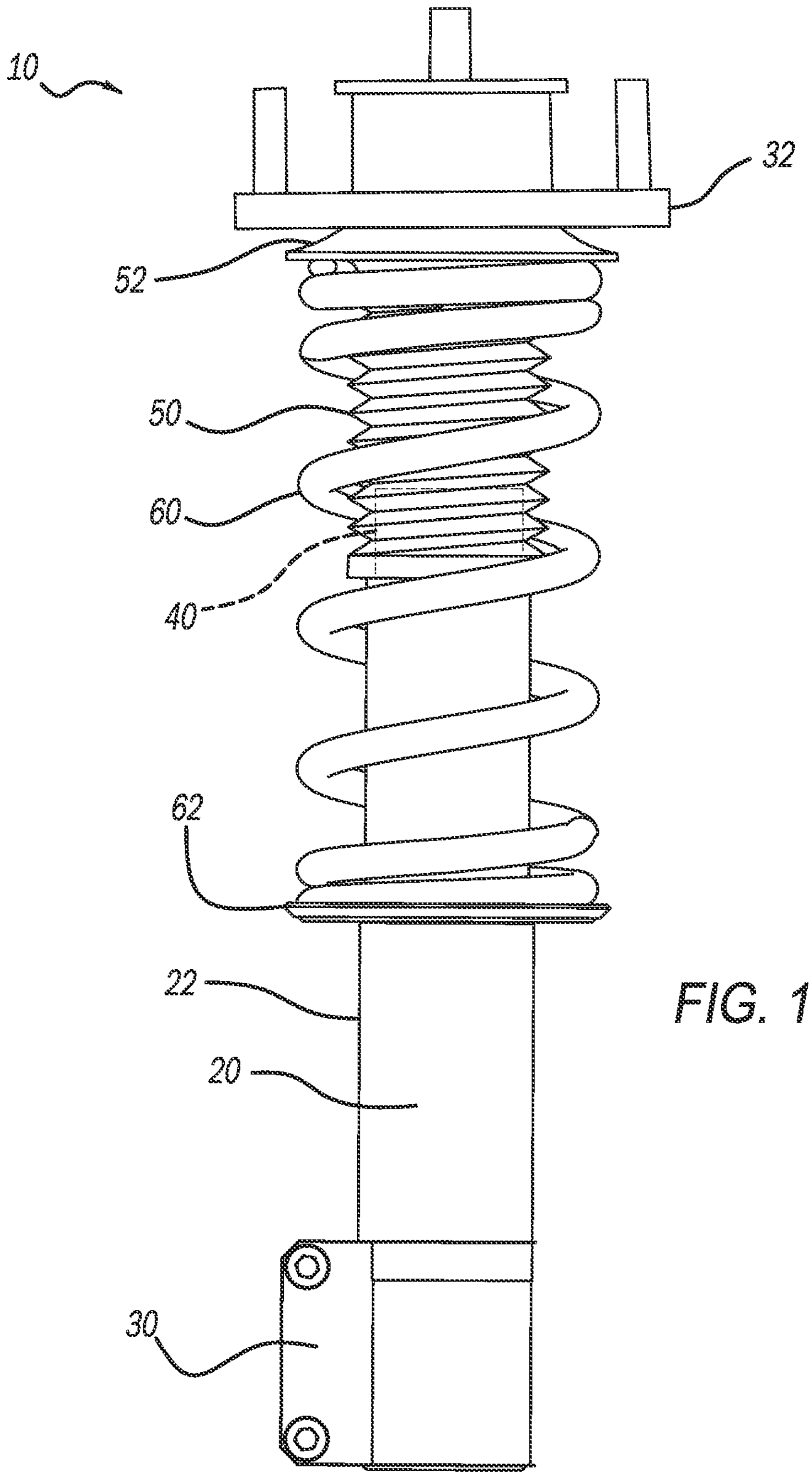
FIG. 1 is a side view of a strut assembly in accordance with the present disclosure.

FIG. 1 illustrates an exemplary strut assembly 10 in accordance with the present disclosure. The strut assembly 10 is configured to be mounted to any suitable vehicle. The strut assembly 10 is configured to absorb and damp shock impulses resulting from the vehicle traveling over rough ground, thereby improving ride quality and vehicle handling. The strut assembly 10 is configured for installation in any suitable passenger vehicle, commercial vehicle, mass transit vehicle, utility vehicle, construction vehicle, military vehicle, etc. The strut assembly 10 may be configured for use in any suitable non-vehicular application as well. For example, the strut assembly 10 may be configured for use with any suitable manufacturing equipment, construction equipment, military equipment, etc.

The strut assembly 10 includes a damper 20. The damper 20 has an outer tube 22 and a piston rod 24 (see FIG. 2) seated within the outer tube 22. The piston rod 24 is slidably movable within the outer tube 22, and extends out from within the outer tube 22. The outer tube 22 includes any fluid suitable for damping movement of the piston rod 24. At a bottom end of the damper 20 is a bottom mount 30. At a distal end of the piston rod 24 is a top mount 32. The bottom mount 30 and the top mount 32 are configured for mounting the strut assembly 10 at any suitable mounting location, such as to a vehicle suspension system. The bottom mount 30 and the top mount 32 may be configured for mounting the strut assembly 10 at any other suitable mounting location as well.

Figure 2:
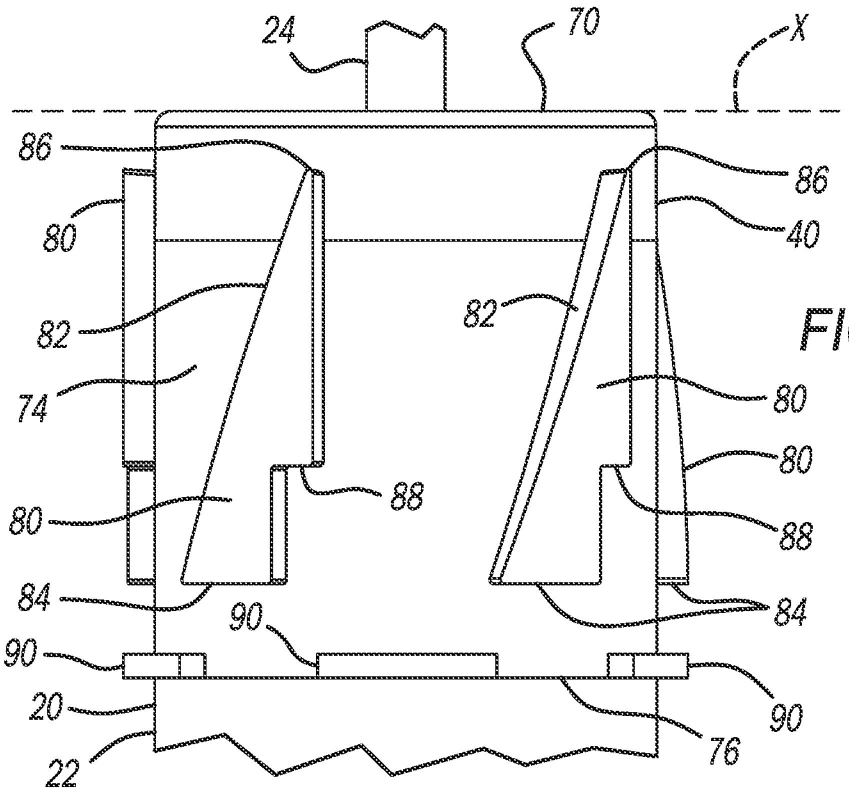
FIG. 2 is a side view of a striker cap of the strut assembly of FIG. 1.
Figure 3:
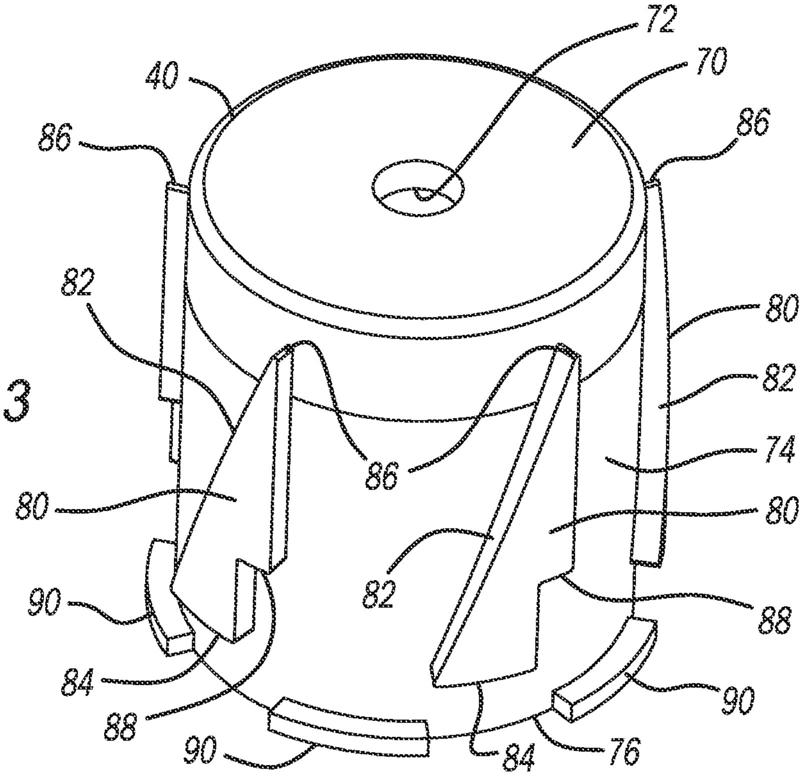
FIG. 3 is a perspective view of the striker cap.

As illustrated in FIGS. 2 and 3, for example, the strut assembly 10 further includes a striker cap 40. The striker cap 40 is seated on an end of the outer tube 22 opposite to the bottom mount 30. In other words, the striker cap 40 is seated on an upper end of the outer tube 22 where the piston rod 24 extends out from within the outer tube 22. The piston rod 24 extends through the striker cap 40, as explained further herein.

The strut assembly 10 further includes a dust boot 50. The dust boot 50 extends around the piston rod 24 to cover the piston rod 24 and protect it from dust, dirt, and other debris. The dust boot 50 also extends around the striker cap 40.

The strut assembly 10 further includes a spring 60, which extends around the dust boot 50, the piston rod 24 covered by the dust boot 50, the striker cap 40, and at least an upper portion of the outer tube 22. A lower end of the spring 60 is seated on a spring seat 62, as illustrated in FIG. 1. An upper end of the spring 60 is in cooperation with a flange 52 of the dust boot 50. The flange 52 is configured as an integrated upper spring isolator configured to cooperate with an upper end of the spring 60. Tightening the top mount 32 against the flange 52 presses the flange 52 against the spring 60, which restricts rotation of the flange 52 along with an upper area of the dust boot 50 that is near the flange 52. A lower (distal) end of the dust boot 50 is free to rotate about a longitudinal axis of the dust boot 50 while the flange 52 and the upper area of the dust boot 50 is held rotationally stationary due to cooperation between the flange 52 and the spring 60.

With renewed reference to FIGS. 2 and 3, the striker cap 40 will now be described in additional detail. The striker cap 40 generally includes a top surface 70 defining an aperture 72 at a center of the top surface 70. A circular sidewall 74 extends downward from the top surface 70. The circular sidewall 74 includes a bottom end 76, which is opposite to the top surface 70.

A plurality of retention tabs 80 are evenly spaced apart around the circular sidewall 74. Each one of the retention tabs 80 includes a ramped surface 82, a retention surface 84, and an upper tip 86. The ramped surface 82 is non-orthogonal to a plane X extending across the top surface 70. The ramped surface 82 is between the retention surface 84 and the upper tip 86. The retention surface 84 is closer to the bottom end 76 than the upper tip 86. The upper tip 86 is closer to the top surface 70 than the retention surface 84. The retention surface 84 extends non-orthogonal to the ramped surface 82. In the example illustrated, the retention surface 84 extends in a plane that is generally parallel to the plane X extending along the top surface 70. Between the retention surface 84 and the upper tip 86 is a stop flange 88. In the example illustrated, the stop flange 88 extends parallel to the retention surface 84 and is beneath the upper tip 86. Any suitable number of retention tabs 80 may be included with the striker cap 40. In the example illustrated, the striker cap 40 includes five retention tabs 80.

The striker cap 40 further includes a plurality of stop tabs 90 proximate to the bottom end 76. The stop tabs 90 are evenly spaced apart around the circular sidewall 74 at or proximate to the bottom end 76. The plurality of stop tabs 90 are lower on the circular sidewall 74 than the plurality of retention tabs 80. Each one of the plurality of stop tabs 90 is laterally spaced apart from the retention tabs 80 such that each one of the stop tabs 90 is between two of the plurality of retention tabs 80. The number of stop tabs 90 included with the striker cap 40 may vary based on the number of retention tabs 80. In the example illustrated, the striker cap 40 includes five of the stop tabs 90, which is equal to the number of retention tabs 80. Any other suitable number of stop tabs 90 may be included, however.

Figure 4:
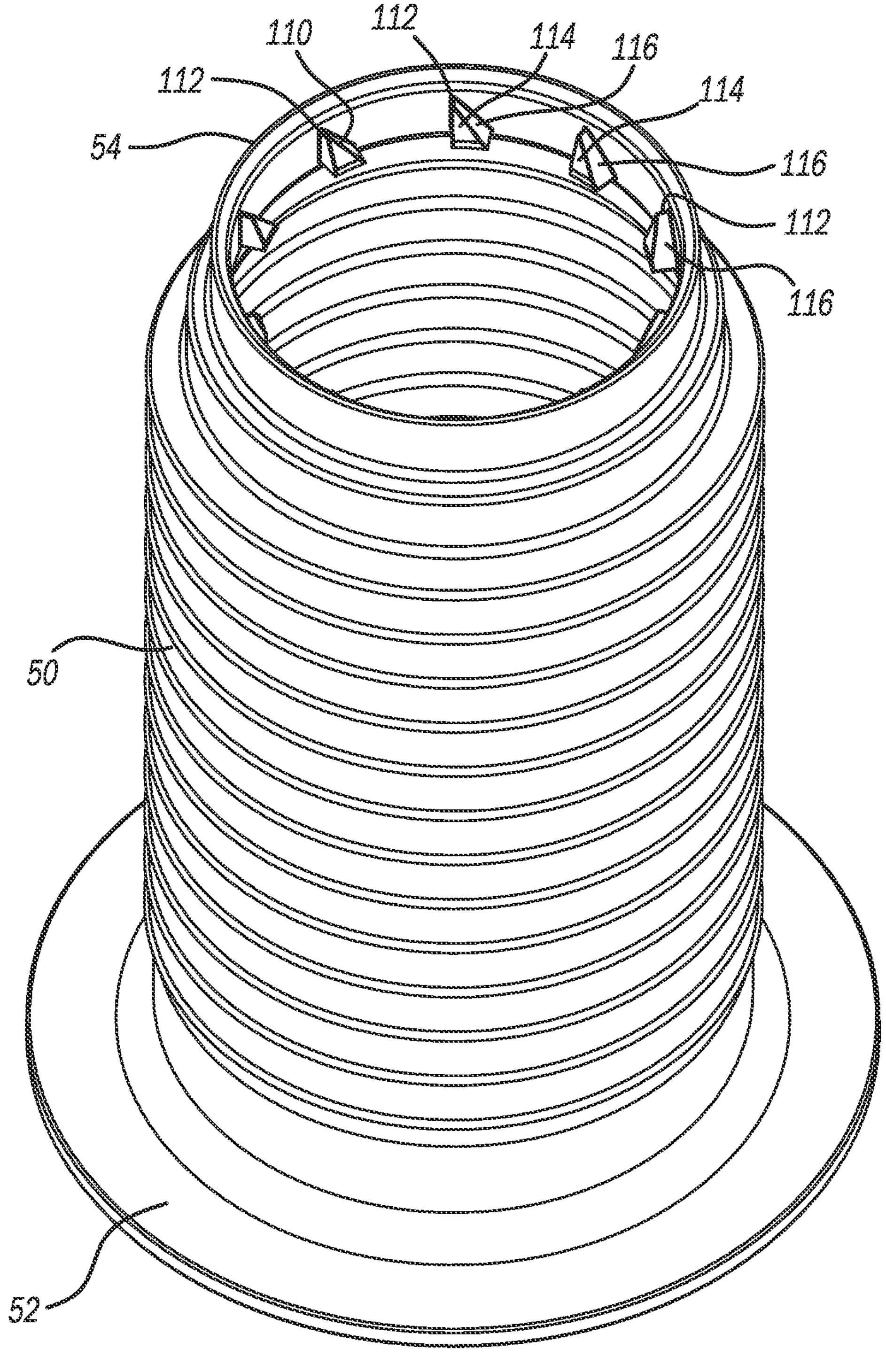
FIG. 4 is a perspective view of a dust boot of the strut assembly of FIG. 1.

With reference to FIG. 4, the dust boot 50 will now be described in additional detail. A dust boot 50 includes the flange 52 at a top end of the dust boot 50. The flange 52 is configured as an integrated upper spring isolator, which abuts the spring 60 when the dust boot 50 is installed in the strut assembly 10. The dust boot 50 includes a plurality of boot locking tabs 110 at a lower end of the dust boot opposite to the flange 52. The boot locking tabs 110 are evenly spaced apart about an interior of the dust boot 50. The number of boot locking tabs 110 included with the dust boot 50 depends on the number of retention tabs 80 and stop tabs 90 included with the striker cap 40. More specifically, the dust boot 50 includes one boot locking tab 110 for each one of the retention tabs 80. The dust boot 50 also includes one of the boot locking tabs 110 for each one of the stop tabs 90. Accordingly, in the example illustrated, the dust boot 50 includes ten boot locking tabs 110.

Each one of the boot locking tabs 110 includes a distal tip 112, a chamfered surface 114, and an angled side surface 116. The distal tip 112 is at a lowermost end of the boot locking tabs 110 furthest from the flange 52. The angled side surface 116 extends from the distal tip 112 into the dust boot 50 in the direction of the flange 52.

Figure 5A:
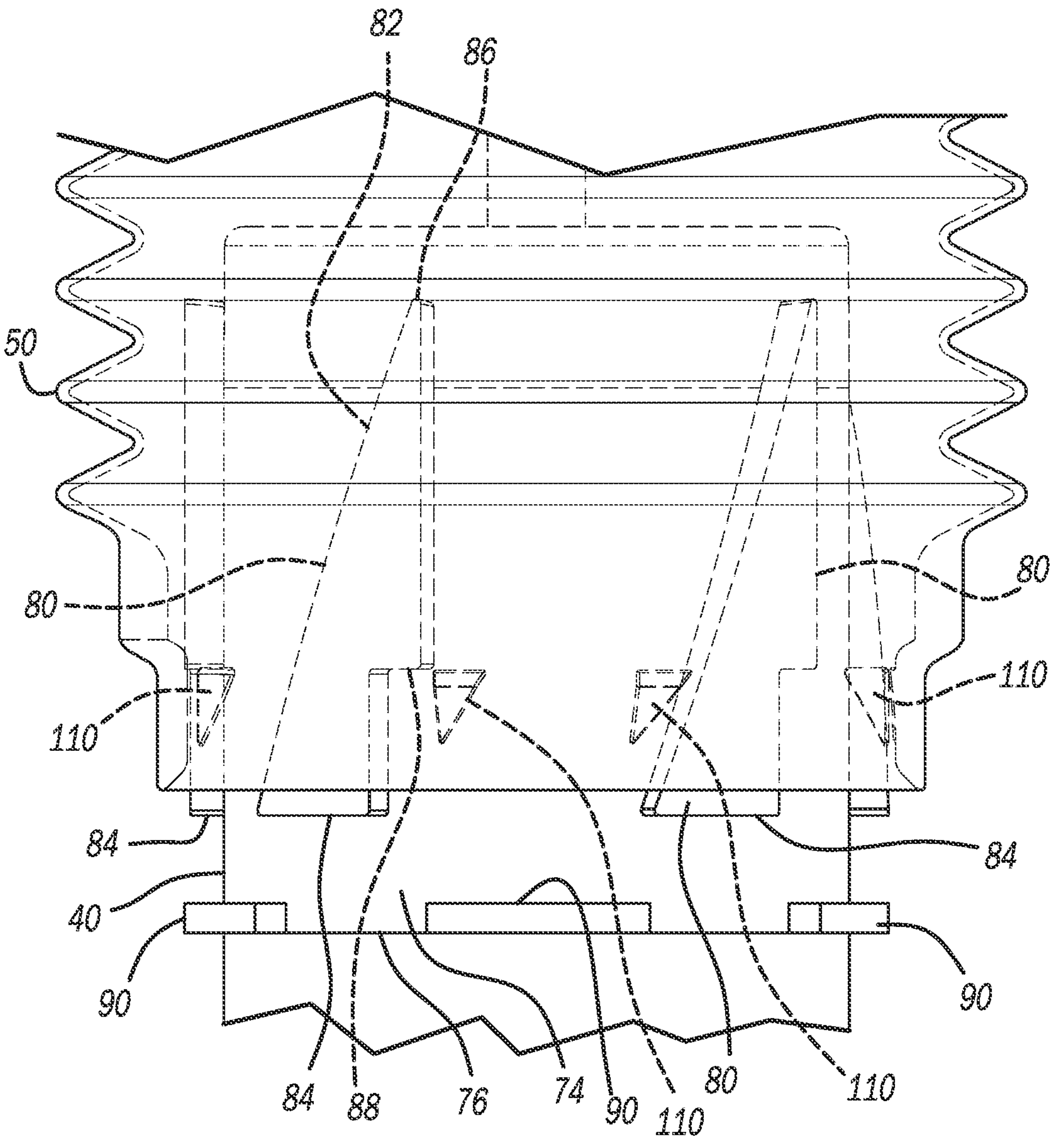
FIG. 5A illustrates interaction between retention tabs of the dust boot and ramped surfaces of the striker cap resulting from the dust boot being pressed onto the striker cap to lock the dust boot to the striker cap with a twist lock.
Figure 5B:
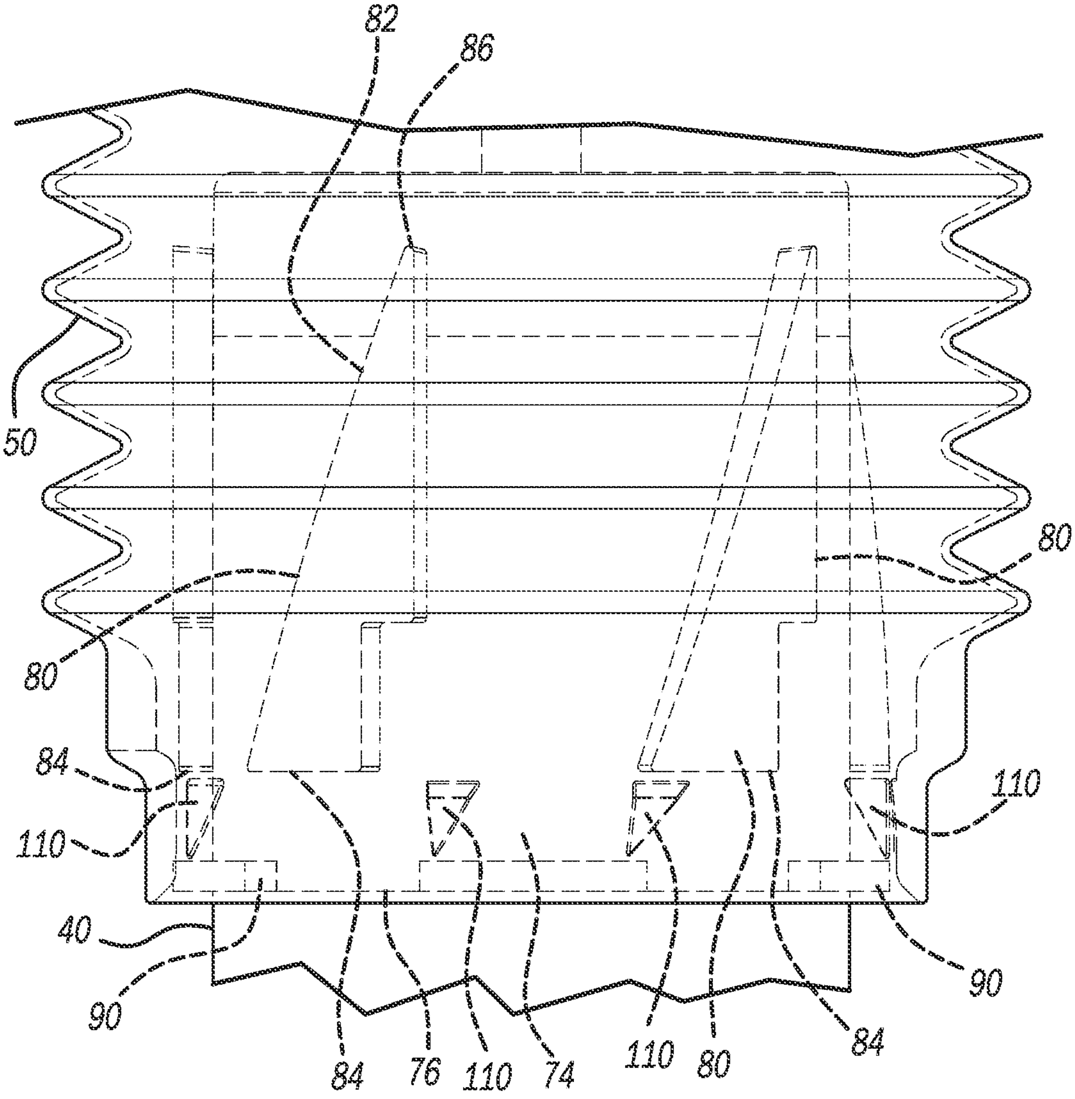
FIG. 5B illustrates the dust boot further pressed onto the striker cap and locked to the striker cap.

With reference to FIGS. 5A and 5B, installation of the dust boot 50 will now be described in additional detail. To install the dust boot 50, it is placed over the piston rod 24 and into the spring 60 surrounding the piston rod 24 such that the upper end of the spring 60 abuts an undersurface of the flange 52. The lower end of the dust boot 50 is initially seated gently against (or near) the top surface 70 of the striker cap 40. The top mount 32 is then tightened downward to apply pressure against the flange 52, which presses the flange 52 against the spring 60. The interaction between the flange 52 and the spring 60 restricts rotation of the flange 52 and a portion of the dust boot 50 near the flange 52. As the top mount 32 is tightened further downward, the spring 60 compresses and the dust boot 50 is forced downward over the striker cap 40.

As illustrated in FIG. 5A, as the dust boot 50 is pushed downward on and over the striker cap 40, alternating ones of the boot locking tabs 110 (a first plurality of the boot locking tabs 110) are pressed into cooperation with the retention tabs 80. More specifically, the boot locking tabs 110 are spaced apart about the interior of the dust boot 50 such that alternating ones of the boot locking tabs 110 contact the ramped surfaces 82 of the retention tabs 80. The chamfered surfaces 114 of the retention tabs 80 abut the circular sidewall 74 to help center the dust boot 50 on the striker cap 40. As the dust boot 50 is compressed further over the striker cap 40, alternating ones of the boot locking tabs 110 slide along the ramped surfaces 82 toward the retention surfaces 84. As the alternating ones of the boot locking tabs 110 slide along the ramped surfaces 82, the lower end 54 of the dust boot 50 rotates or twists; although the opposite end of the dust boot 50 proximate to the flange 52 remains rotationally fixed by the interaction between the flange 52 and the spring 60.

Once the boot locking tabs 110 reach the bottom of the ramped surfaces 82 and pass around an end of the ramped surfaces 82, the lower end 54 of the dust boot 50 will snap or otherwise rotate back to its original, relaxed position to move the alternating ones of the boot locking tabs 110 beneath the retention surfaces 84, as illustrated in FIG. 5B. In this manner, the dust boot 50 is affixed to the striker cap 40 with a twist lock. Should the boot locking tabs 110 in cooperation with the retention tabs 80 over rotate or slide off of the retention surfaces 84, the stop flange 88 is present to catch the boot locking tabs 110 to prevent the dust boot 50 from becoming detached from the striker cap 40. The boot locking tabs 110 that are not in cooperation with the retention tabs 80 (a second plurality of the boot locking tabs 110) are arranged opposite to the stop tabs 90. Cooperation between the boot locking tabs 110 and the stop tabs 90 prevents over insertion of the dust boot 50 onto the striker cap 40.

FIG. 6 illustrates relative positioning and dimensions of the retention tabs 80 and the boot locking tabs 110. As illustrated in FIG. 6, "L" is the circumference of the striker cap 40; "n1" is the number of boot locking tabs 110; "n2" is the number of retention tabs 80 of the striker cap 40; "a" is a total length of the ramped surface 82; "b" is a total length of the boot locking tab 110; and "c" is a length of the a tail of the ramped surface 82. The striker cap 40 and the dust boot 50 are configured such that two boot locking tabs 110 do not fit between two retention tabs 80 when the dust boot 50 is pressed down onto the striker cap 40; and thus $L/n1+b>L/n2-a$. $L/n1+b$ is a total space of a rear of one boot locking tab 110 to a front of another boot locking tab 110 (two full boot locking tabs 110). $L/n2-a$ is the space between a top end of one ramped surface 82 and a bottom beginning of the next ramped surface 82; this configuration is such because if two of the boot locking tabs 110 can fit in the space between the top end of one ramped surface 82 and the bottom beginning of the next ramped surface, then a condition will exist where the boot locking tabs 110 do not engage the ramped surface 82 and can slide straight down to the stop tabs 90. Another condition is that two boot locking tabs 110 need to slip between two retention tabs 80 after sliding down the ramped surface 82, and thus $L/n1+b<L/n2-a+c$. $L/n2-a+c$ is the minimum space between the edge of the bottom of one ramped surface 82 and the start of another neighboring ramped surface 82. It is also the maximum space allowed to fully fit two boot locking tabs 110 therein; this configuration is such that if two boot locking tabs 110 cannot fit in the space then the tabs 110 will not be able to slide onto the bottom retention surface 84. An additional condition is that spacing must be consistent at each set of retention tabs 80 and boot locking tabs 110; thus $n1=2*n2$. The space between the boot locking tabs 110 also needs to be larger than the length of the retention surface 84; thus $L/n1-b>a-c$. The retention tabs 80 and the boot locking tabs 110 are thus configured such that ($L/n2-a<L/n1+b<L/n2-a+c$) and ($a-c<L/n1-b$).

FIG. 7 illustrates another striker cap 40' and another dust boot 50' in accordance with the present disclosure. Features of the striker cap 40' that are the same as, or substantially similar to, features of the striker cap 40 are designated in FIG. 7 with the same reference numerals, but with the addition of the prime (') symbol. Features of the dust boot 50' that are the same as, or substantially similar to, the dust boot 50 are designated in FIG. 7 with the same reference numerals, but with the prime (') symbol added. As illustrated in FIG. 7, the retention tabs 80' are similar to, but are shaped differently from, the retention tabs 80. Likewise, the boot locking tabs 110' of the dust boot 50' are similar to, but shaped differently from, the boot locking tabs 110. The dust boot 50' is locked onto the striker cap 40' by way of the same "twist-lock" described above with respect to the locking of the dust boot 50 onto the striker cap 40.

The present disclosure provides numerous advantages. For example, locking the dust boot 50, 50' onto the striker cap 40, 40' with the twist-lock configuration described above prevents the dust boot 50, 50' from contacting the spring 60, the spring seat 62, or other adjacent parts of the strut assembly. The boot locking tabs 110, 110' and the retention tabs 80, 80' are configured to provide a self-guided installation of the dust boot 50, 50' at any starting orientation of the dust boot 50, 50' relative to the striker cap 40, 40'. The present disclosure also eliminates any need to manually pull the lower end 54, 54' of the dust boot 50, 50' over the striker cap 40, 40'.

The present disclosure also facilitates removal of the dust boot 50, 50'. Specifically, to remove the dust boot 50, 50', it merely needs to be twisted in the opposite direction and requires no more than equal the install force. This facilitates servicing of the spring 60, the damper 20, the top mount 32, and the spring seat 62 because the dust boot 50, 50' typically needs to be removed before access to any of these parts may be obtained.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A strut assembly configured to be mounted to a vehicle, the strut assembly comprising:

a damper including an outer tube and a piston rod extending out from within the outer tube;

a striker cap on the outer tube and defining an aperture through which the piston rod extends, the striker cap including a plurality of retention tabs each having a ramped surface extending to a retention surface that is non-orthogonal to the ramped surface;

a spring extending around the piston rod; and a dust boot extending around the piston rod and arranged between the spring and the piston rod, the dust boot including a plurality of dust boot locking tabs configured to cooperate with the plurality of retention tabs to lock the dust boot to the striker cap;

wherein each one of the plurality of dust boot locking tabs is inside the dust boot and configured to slide along the ramped surface into cooperation with the retention surface of the plurality of retention tabs to rotate the dust boot and lock the dust boot to the striker cap.

2. The strut assembly of claim 1, wherein:

the striker cap includes a top surface defining the aperture and a circular sidewall extending from the top surface; and the plurality of retention tabs are spaced apart about the circular sidewall.

3. The strut assembly of claim 2, wherein:

the ramped surface of each one of the plurality of retention tabs extends non- orthogonal to a plane extending along the top surface; and the retention surface of each one of the plurality of retention tabs extends parallel to the plane extending across the top surface.

4. The strut assembly of claim 2, wherein each one of the plurality of retention tabs further includes a stop flange between the retention surface and the top surface of the striker cap.

5. The strut assembly of claim 2, wherein each one of the plurality of retention tabs includes an upper tip at an upper end of the plurality of retention tabs, the retention surface is at a lower end of the plurality of retention tabs.

6. The strut assembly of claim 2, wherein the striker cap further includes a plurality of stop tabs spaced apart around a bottom end of the circular sidewall that is opposite to the top surface.

7. The strut assembly of claim 6, wherein the plurality of stop tabs are laterally spaced apart from, and offset from, the retention tabs such that each one of the plurality of stop tabs is between two of the plurality of retention tabs.

8. The strut assembly of claim 1, wherein each one of the plurality of dust boot locking tabs includes a distal tip.

9. The strut assembly of claim 1, wherein each one of the plurality of dust boot locking tabs includes a chamfered surface configured to abut a circular sidewall of the striker cap.

10. The strut assembly of claim 1, wherein the dust boot includes a boot flange configured as an integrated upper spring isolator at an upper end of the dust boot.

11. A strut assembly configured to be mounted to a vehicle, the strut assembly comprising:

a damper including an outer tube and a piston rod slidably movable within the outer tube;

a striker cap on the outer tube, the striker cap including:

a top surface defining an aperture through which the piston rod extends;

a circular sidewall extending from the top surface, the circular sidewall including a bottom end opposite to the top surface; and a plurality of retention tabs evenly spaced apart about the circular sidewall, each one of the plurality of retention tabs including a ramped surface extending to a retention surface that is non-orthogonal to the ramped surface, the ramped surface is non-orthogonal to a plane extending along the top surface, and the retention surface is closer to the bottom end than the top surface;

a spring extending around the piston rod; and a dust boot extending around the piston rod and arranged between the spring and the piston rod, the dust boot including a plurality of boot locking tabs at an interior of the dust boot, the plurality of boot locking tabs are configured to cooperate with the plurality of retention tabs to lock the dust boot to the striker cap;

wherein:

the retention surface is beneath the ramped surface; and each one of the plurality of retention tabs further includes a stop flange between the retention surface and the top surface of the striker cap.

12. The strut assembly of claim 11, wherein each one of the plurality of retention tabs further includes an upper tip at an upper end of the plurality of retention tabs, the stop flange is beneath the upper tip and between the upper tip and the retention surface.

13. The strut assembly of claim 11, wherein the striker cap further includes a plurality of stop tabs spaced apart around the bottom end of the circular sidewall, the plurality of stop tabs are laterally spaced apart from, and vertically offset from, the retention tabs such that each one of the plurality of stop tabs is between two of the plurality of retention tabs.

14. The strut assembly of claim 11, wherein the dust boot includes a boot flange configured as an integrated upper spring isolator at an upper end of the dust boot.

15. A strut assembly configured to be mounted to a vehicle, the strut assembly comprising:

a damper including an outer tube and a piston rod slidably movable within the outer tube;

a top mount in cooperation with a distal end of the piston rod;

a striker cap on the outer tube, the striker cap including:

a top surface defining an aperture through which the piston rod extends;

a circular sidewall extending from the top surface, the circular sidewall including a bottom end opposite to the top surface;

a plurality of retention tabs evenly spaced apart about the circular sidewall, each one of the plurality of retention tabs including a ramped surface extending to a retention surface that is non-orthogonal to the ramped surface, the ramped surface is non-orthogonal to a plane extending along the top surface, and the retention surface is closer to the bottom end than the top surface; and a plurality of stop tabs spaced apart around the bottom end of the circular sidewall, the plurality of stop tabs are laterally offset from the retention tabs;

a spring extending around the piston rod; and a dust boot extending around the piston rod and arranged between the spring and the piston rod, the dust boot including:

a flange at a top end of the dust boot, the flange configured as an integrated upper spring isolator configured to cooperate with the spring;

a first plurality of dust boot locking tabs within the dust boot, each one of the first plurality of dust boot locking tabs is configured to slide along the ramped surface into cooperation with the retention surface of the plurality of retention tabs to rotate the dust boot and lock the dust boot onto the striker cap; and a second plurality of dust boot locking tabs within the dust boot, each one of the second plurality of dust boot locking tabs is configured to align vertically with one of the plurality of stop tabs when the first plurality of dust boot locking tabs are in cooperation with the retention surfaces of the plurality of retention tabs.

16. The strut assembly of claim 15, wherein each one of the plurality of dust boot locking tabs includes a distal tip and a chamfered surface configured to abut the circular sidewall of the striker cap.

17. The strut assembly of claim 15, wherein:

the ramped surface extends from an upper tip to the retention surface; and the retention surface is beneath the ramped surface.

* * * * *